(12) United States Patent
Schwartz

(10) Patent No.: US 10,399,668 B2
(45) Date of Patent: Sep. 3, 2019

(54) ACTUATOR DRIVE DISCONNECTION SYSTEM

(71) Applicant: Goodrich Actuation Systems SAS, Buc (FR)

(72) Inventor: Laurent Schwartz, Saint Jean de Beauregard (FR)

(73) Assignee: GOODRICH ACTUATION SYSTEMS SAS, Buc (FR)

(*) Notice: Subject to any disclaimer, the term of this patent is extended or adjusted under 35 U.S.C. 154(b) by 449 days.

(21) Appl. No.: 15/159,856

(22) Filed: May 20, 2016

(65) Prior Publication Data
US 2016/0340027 A1 Nov. 24, 2016

(30) Foreign Application Priority Data
May 22, 2015 (EP) .................................. 15305769

(51) Int. Cl.
| | | |
|---|---|---|
| *B64C 13/32* | (2006.01) | |
| *F16D 11/14* | (2006.01) | |
| *B64F 5/40* | (2017.01) | |
| *F16D 11/00* | (2006.01) | |
| *F16D 23/12* | (2006.01) | |

(52) U.S. Cl.
CPC ............. *B64C 13/32* (2013.01); *B64F 5/40* (2017.01); *F16D 11/14* (2013.01); *F16D 2011/002* (2013.01); *F16D 2023/123* (2013.01)

(58) Field of Classification Search
CPC . B64C 13/32; B64F 5/40; F16D 11/14; F16D 2011/002; F16D 2023/123; G05G 1/02
See application file for complete search history.

(56) References Cited

U.S. PATENT DOCUMENTS

| | | | | |
|---|---|---|---|---|
| 4,130,030 | A | | 12/1978 | Stratienko |
| 4,253,626 | A | * | 3/1981 | Muscatell .............. B64D 37/26 244/135 R |
| 4,685,550 | A | | 8/1987 | Metcalf |
| 5,057,062 | A | * | 10/1991 | Yamasaki .......... B60K 17/3467 180/248 |

(Continued)

FOREIGN PATENT DOCUMENTS

| | | | | |
|---|---|---|---|---|
| CN | 202284617 | * | 6/2012 | .............. F16D 11/14 |
| CN | 202284617 U | | 6/2012 | |

(Continued)

OTHER PUBLICATIONS

CN202284617Translation.*
European Search Report for application No. EP15305769.0; dated Nov. 12, 2015, 13 pages.

*Primary Examiner* — Assres H Woldemaryam
(74) *Attorney, Agent, or Firm* — Cantor Colburn LLP

(57) ABSTRACT

An actuator drive disconnection system comprises a housing and a drive coupling mounted in the housing, the drive coupling coupling a drive motor to an actuator drive train. A manually operable drive disconnection mechanism selectively moves the drive coupling from a first position in which the motor and actuator drive train are coupled and a second position in which the motor and actuator drive train are disconnected. The drive disconnection mechanism comprises an operating element which is manually extended from the housing to move the drive coupling from the first position to the second position.

15 Claims, 4 Drawing Sheets

(56) References Cited

U.S. PATENT DOCUMENTS

| | | | |
|---|---|---|---|
| 6,109,411 A * | 8/2000 | Bigley | B60K 17/3515 |
| | | | 180/247 |
| 7,213,482 B2 | 5/2007 | Minasian | |
| 8,450,894 B2 | 5/2013 | Blanding | |
| 2010/0181435 A1* | 7/2010 | Sakurai | B64C 21/02 |
| | | | 244/209 |

FOREIGN PATENT DOCUMENTS

| | | | |
|---|---|---|---|
| EP | 2568188 A2 * | 3/2013 | F16D 11/14 |
| EP | 2568188 A2 | 3/2013 | |
| WO | 2011124324 A1 | 10/2011 | |

\* cited by examiner

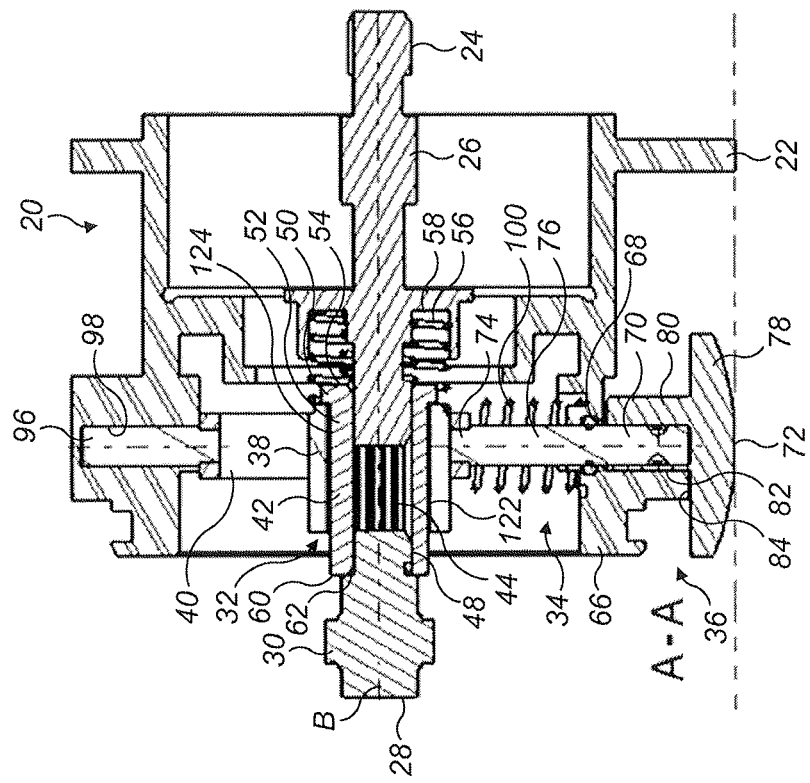
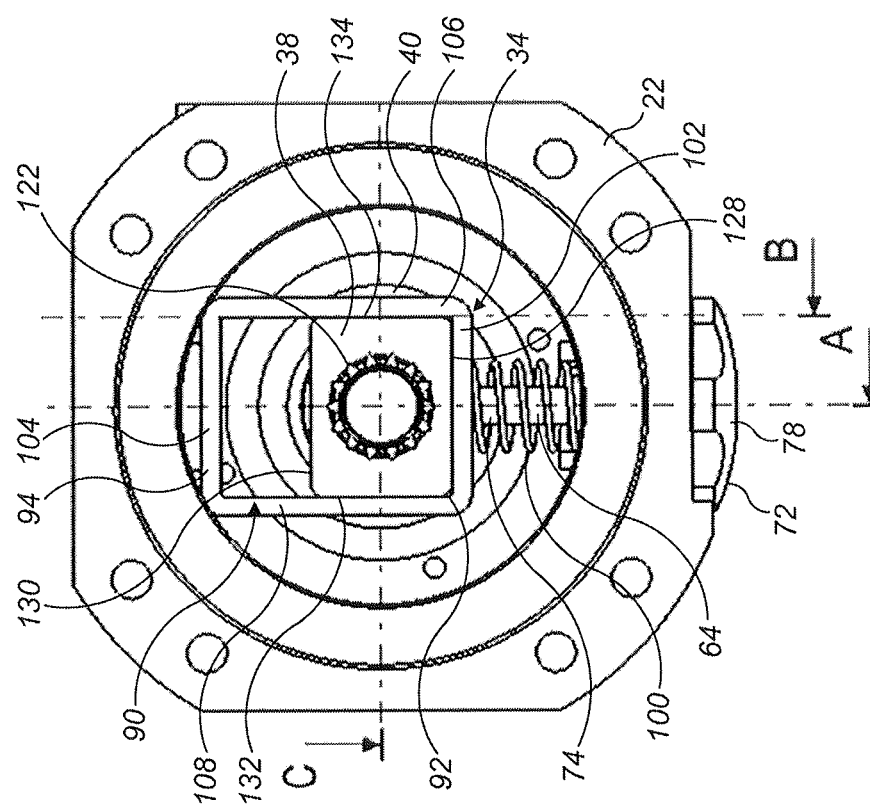
FIG. 3
FIG. 2

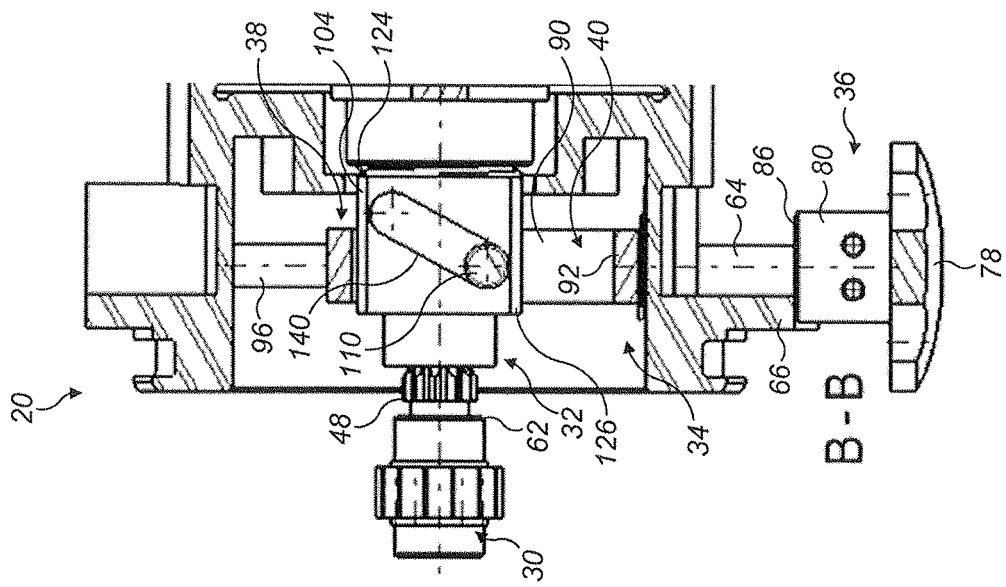
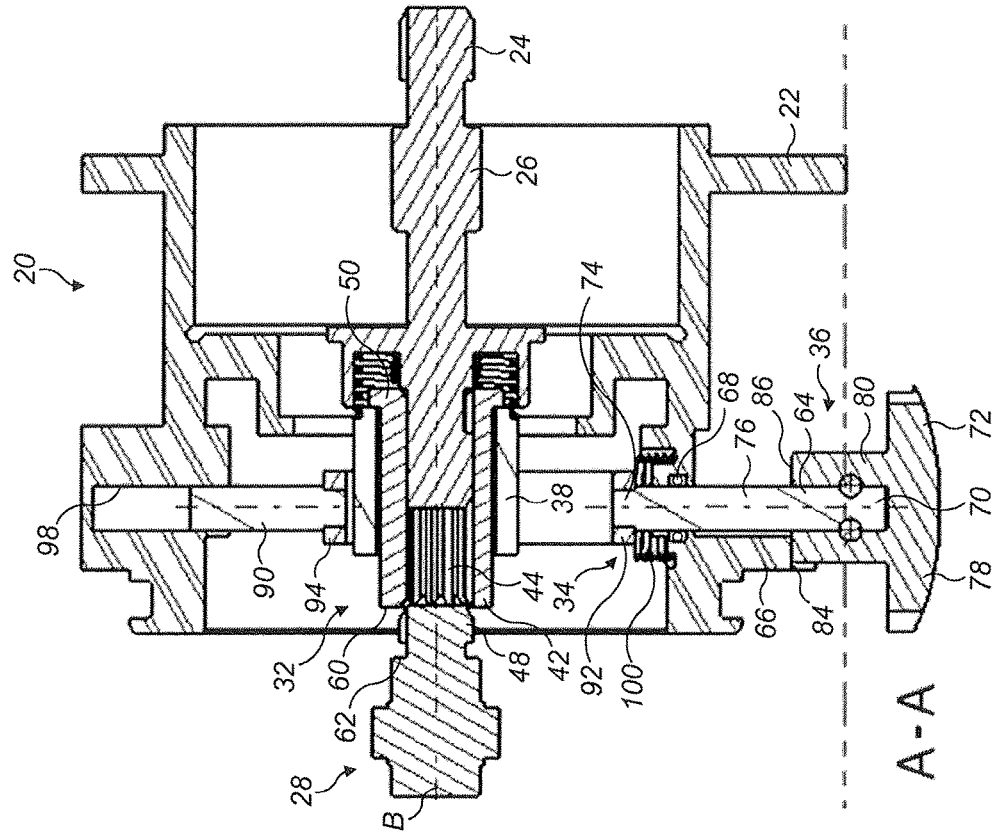

ACTUATOR DRIVE DISCONNECTION SYSTEM

FOREIGN PRIORITY

This application claims priority to European Patent Application No. 15305769.0 filed May 22, 2015, the entire contents of which is incorporated herein by reference.

TECHNICAL FIELD

The present disclosure relates to actuator systems and in particular to disconnection of a motor from the drive train of an actuator.

BACKGROUND OF THE INVENTION

An actuator system may typically comprise an actuator motor which is connected, via an actuator drive train to an actuator output such as a ram, actuator arm or screw jack, the actuator output then being connected by a suitable connection to a movable component. Such systems are widely used in, for example, aircraft systems where, typically, the actuator may be connected to a control or other movable surface such as a flap, spoiler, door and so on. It is necessary to perform maintenance on the actuator system or driven component from time to time. In such circumstances, it would be potentially dangerous to maintenance personnel should the actuator motor operate causing the actuator drive train and component to move.

The present disclosure seeks to mitigate this problem.

SUMMARY

From a first aspect of the disclosure there is provided an actuator drive disconnection system comprising: a housing; a drive coupling mounted in the housing, the drive coupling coupling a drive motor to an actuator drive train; and a manually operable drive disconnection mechanism for selectively moving the drive coupling from a first position in which it couples the motor to the actuator drive train and a second position in which motor and the actuator drive train are disconnected; the drive disconnection mechanism comprising an operating element which is manually extended from the housing to move the drive coupling from the first position to the second position.

In this manner, not only will the motor be disconnected from the actuator drive train, but the withdrawal of the operating element may act as a visible indication that the motor is disconnected.

The housing and operating element may be provided with inter-engaging formations for retaining the operating element in its extended position.

The operating element may comprise a head portion which is rotatable so as to bring the retaining formations into engagement.

A section of the operating element extended from the housing may be provided with markings, for example colouring, which may indicate quickly to an operator that the operating element is extended and the motor disconnected.

The drive coupling may comprise a coupling element for example a coupling sleeve which is movable axially along a motor output axis and an actuator drive train input axis to disconnect the motor and the actuator drive train.

The drive coupling may be biased towards its first position.

The drive disconnection mechanism may comprise a disconnection element operatively coupled to the operating element and to the drive coupling for moving the drive coupling element from the first position to the second position as the operating element is extended from the housing.

The disconnection element may comprise an element which is mounted around the coupling element and which engages the coupling element to effect the movement.

The coupling element may comprise a flange, for example at one end thereof, and the disconnection element engage the flange to effect the movement.

Generally, the operating element will be arranged to move along an axis which is at an angle, for example 90° to the axis of the coupling element and disconnection element, so a linkage may be provided to convert the movement of the disconnection element into the required axial movement of the disconnection element.

The linkage may comprise a cam mechanism.

In one arrangement, a frame is connected to the operating element for receiving the disconnection element, with one or more camming elements being provided between the frame and the disconnection element.

In one example an inclined groove may be formed on the disconnection element and a pin provided on the frame and disconnection element engaging with the groove whereby movement of the frame by the operating element effects causes the pin to move along the groove, thereby effecting the axial movement of the disconnection element and thus of the coupling.

The frame may, for example, comprise, opposed, parallel arms which slidably receive opposed surfaces of the disconnection element, the camming elements being provided between the opposed arms and the opposed surfaces.

When the drive coupling is engaged, there may be clearance between the disconnection element and the drive coupling to avoid frictional losses in the coupling.

The disconnection mechanism may be received within a cavity which is closed by a door which must be opened to gain access to the operating element. In its extended position, the operating element may be arranged so as to interfere with the door so as to prevent the door being closed while the motor is disconnected from the actuator drive train.

The cavity may be in an aircraft wing, and the disclosure extends to an aircraft wing comprising a cavity which is closed by a door, and an actuator disconnection system as described in any of the foregoing paragraphs, wherein the disconnection mechanism of the actuator disconnection system is arranged within the cavity, and the door must be opened to gain access to the operating element of the disconnection mechanism and wherein in its extended position, the operating element is arranged so as prevent the door being closed while the drive is disconnected.

The disclosure also extends to a method of performing maintenance on an actuator system comprising a motor and an actuator drive train, the method comprising disconnecting the motor from the actuator drive train, for example by means of an actuator drive disconnection system as discussed in the foregoing paragraphs.

The motor may be disconnected from the actuator drive train by means of an operating element which is manually extended from a housing to effect the disconnection.

The extended operating element may be arranged such that it interferes with a door of a cavity containing the actuator so as to prevent the door being closed while the motor is disconnected from the actuator drive train.

BRIEF DESCRIPTION OF DRAWINGS

A non-limiting embodiment of this disclosure will now be described with reference to the accompanying drawings in which:

FIG. 2 shows a transverse cross sectional view of a disconnection system in accordance with this disclosure;

FIG. 3 shows a longitudinal cross sectional view of the disconnection system of FIG. 2 along the line A-A in a first operational condition;

FIG. 4 shows a cross sectional view of the disconnection system of FIG. 2 along the line A-A in a second operational condition;

FIG. 5 shows a cross sectional view along the line B-B of FIG. 2, with the disconnection system in the second condition shown in FIG. 4;

DETAILED DESCRIPTION

Figure 1:
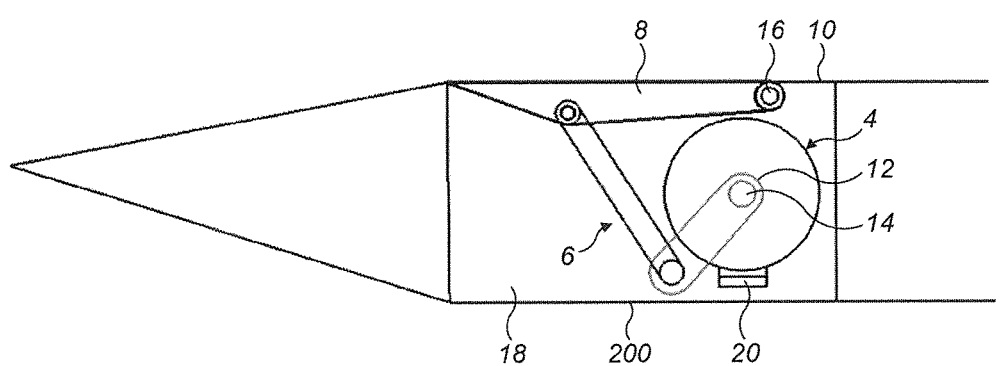
FIG. 1 shows an installation comprising an actuator system incorporating a disconnection system in accordance with this disclosure.

FIG. 1 shows an exemplary aircraft system 2 which incorporates an actuator 4. In this case, the actuator 4 is coupled to a linkage 6 which drives a spoiler flap 8 which is provided on a wing surface 10 of an aircraft. Of course this is not a limiting application and the present disclosure may be applied to any actuator system. The disclosure finds particular application in aircraft where a wide variety of control surfaces, doors, etc. are moved by actuators. Also, the actuator 4 need not be connected to a linkage 6 as shown but to any mechanism which produces a movement of the flap 8.

The actuator 4 comprises a rotary motor 12, for example a rotary electric motor 12, rotation of the motor 12 resulting in rotation of an actuator output 14 which causes movement of the linkage 6, and thereby rotation of the flap 8 about a pivot axis 16.

It is necessary to perform maintenance on such systems from time to time. When performing maintenance, operation of the motor 10 during the maintenance operation may cause injury to maintenance personnel. It is therefore desirable to ensure that this does not occur.

To achieve this in embodiments of this disclosure, a drive disconnection system 20 is installed at some point in the actuator drive train between the motor 12 and the actuator output 14. An exemplary disconnection system will now be described with reference to FIGS. 2 to 5.

As shown, the disconnection system 20 includes a housing 22 which may be mounted or provided at any convenient point in the drive train between the motor 20 and the actuator output 14. The housing 22 need not be a stand-alone component but may be integrated with other components, if appropriate.

The disconnection system 20 receives a rotary output 24 of the motor 10, for example an output shaft 26 of the motor 12. In the condition shown in FIG. 3, drive is transmitted to an input 28 of the remainder of the actuator 4, for example a drive train input shaft 30, by means of a coupling element 32. The input shaft 30 may, for example, be connected to a gearbox (not shown) for producing a desired rotational speed of the actuator output 14.

In the condition shown in FIG. 4, however, the motor 12 is disconnected from the input shaft 30 by means of a disconnection mechanism 34. As will be described further below, the disconnection mechanism 34 comprises a manually operable operating element 36, a disconnection element 38 and a linkage element 40.

The coupling element 32 in this embodiment is formed as a sleeve 42 having internal splines 44. As can be seen in FIG. 3, for example, the splines 44 engage splines 46, 48 formed on the external surface of the output shaft 26 and the input shaft 30 respectively in order to transmit rotation between the output shaft 26 and input shaft 30. Of course it is within the scope of this disclosure that another form of transmission may be provided, for example a splined interconnection with the output shaft 26 and inter-engaging axially facing teeth formed on an end of the sleeve 42 and the input shaft 30 respectively.

The coupling sleeve 42 is formed with a radially projecting flange 50, in this embodiment at one end 52 of the sleeve 42. A first surface 54 of the flange 50 receives one end of a spring 56 which at its other end is mounted in a seat 58 in the output shaft 26. The spring 56 biases the coupling sleeve 42 into full engagement with the input shaft 30, as shown in FIG. 3. In this condition, a second end 60 of the coupling sleeve 42 engages a shoulder 62 provided on the input shaft 30.

As mentioned above, the disconnection mechanism 34 comprises a manually operable operating element 36, a disconnection element 38 and an actuating element 40.

The manually operable operating element 36 comprises a shaft 64 which is mounted for reciprocating axial movement along an axis A, which is in this embodiment is generally perpendicular to the common rotational axis B of the motor output 24 and actuator input 28. The shaft 64 is mounted in a boss 66 of the housing 22 a seal 68 being provided between the boss 66 and the shaft 64 to prevent fluid within the housing 22 from escaping around the shaft 64.

A first end 70 of the shaft 64 is connected to a knob 72, and a second end 74 of the shaft 64 is connected to the actuating element 40. A central region 76 of the shaft 64 may be marked, for example coloured, for reasons to be explained further below.

The knob 72 has a head 78 and a wall 80 extending from the head 78 and received over the first end 70 of the shaft 64. In this embodiment, the knob 72 is mounted to the shaft 64 so as to be able to rotate relative to the shaft 64 about the shaft axis A, although in other embodiments, the knob 72 may rotate with the shaft 64. In such arrangements, however, the connection between the shaft 64 and the actuating element 40 must be able to accommodate relative rotational movement of the two parts.

The wall 80 does not extend completely around the axis A, but has a cut out side portion 82 which, when the knob 72 is in the position shown in FIG. 3, allows the head 78 of the knob 72 to engage with an external seat 84 provided on the housing boss 66. However, when the operating element 36 is pulled out or extended from the housing 22 and the knob 72 rotated through a predetermined angle, for example 90°, the lower edge 86 of the wall 80 may be received on the seat 84 as shown in FIGS. 4 and 5 so as to retain the knob 78 and shaft 64 in the extended position.

In this embodiment, the actuating element 40 is constructed as a frame 90. A first end 92 of the frame 90 is attached or mounted to the second end 74 of the shaft 64. In other embodiments, the frame 90 may be integrally formed with the shaft 64. A second end 94 of the frame 90 is attached to a locating pin 96 which extends into, and is slidable in, a bore 98 provided in the housing 22. The guide pin 96 and bore 98 may have suitable inter-engaging formations (for example they may be non-circular in cross section) so as to prevent the frame 90 from rotating about the axis A. Again in certain embodiments, the locating pin 96 may be formed integrally with the frame 90. A spring 100 is mounted around the shaft 64 between the first end 94 of the frame 90 and the boss 66 of the housing 22 so as to bias the frame 90 and shaft 64 such that the locating pin 96 is more fully received in the bore 98, as shown in FIG. 3.

The frame 90 is generally rectangular in shape and comprises a base limb 102 which is connected to the shaft 64, a top limb 104 which is connected to the guide pin 96 and a pair of parallel side limbs 106, 108 extending between the base limb 102 and top limb 104. As shown in FIG. 5, respective a pin 110 is mounted each of the side limbs 106, 108 so as to project inwardly from the side limbs 106, 108. In this embodiment the pins 110 are arranged directly opposite one another. Although the frame 90 is shown as being rectangular, in other embodiments, it may simply be U-shaped, for example if means other than the location pin 96 are provided for locating the frame 90.

The frame 90 receives and effects the reciprocating linear movement of the disconnection element 38.

In this embodiment, the disconnection element 38 is formed as a block 120, in particular a generally rectangular block 120, having a central bore 122 for receiving the coupling element 32, extending between opposed first and second ends 124, 126, opposed base and top surfaces 128, 130 and opposed side surfaces 132, 134.

The first end 124 of the disconnecting element 38 is arranged opposite the flange 50 of the coupling element 32. However, in the fully engaged condition shown in FIG. 3, with the second end 60 of the coupling element 32 engaged with the shoulder 62 of the drive input, the first end 124 of the disconnecting element 36 is spaced from the flange 50 so as to avoid friction between the two components.

In addition, the bore 122 of the disconnecting element 38 is sized such that there is a radial clearance between the external surface of the block 120 and the internal surface of the bore 122. This is to prevent any friction between the two components while the drive is connected. The coupling element 32 is therefore supported solely by the respective output and input shafts 26, 30 in that condition.

The side surfaces 132, 134 of the block are generally parallel and are received in a sliding manner between the side walls 106, 108 of the frame 90. Each side surface 132, 134 of the block 120 includes an inclined cam groove 140, as shown in FIG. 5. The respective grooves 140 receive the inwardly projecting pins 110 of the frame 90. It will be understood that as the frame 90 moves along axis A, the inter-engagement of the pins 110 in the grooves 140 will result in the movement of the block 120 along the axis B, in effect forming a cam linkage.

Operation of the disconnection system 20 will now be described.

In the condition shown in FIG. 3, the head 78 of the knob 72 is received on the seat 84 of the housing boss 66. In this condition, the pins 110 will be positioned at the top (in the sense of FIG. 5) of the cam grooves 140 meaning that the disconnection element 38 is in the position shown in FIG. 3. The spring 58 biases the coupling sleeve 42 to engage the input shaft 30 so that rotation of the motor is transmitted to the input shaft 30 via the coupling sleeve 42. A mentioned above, in this condition, there is no contact between the coupling sleeve 42 and the disconnection element 38, thereby avoiding frictional losses in the system.

When it is desired to disconnect the motor 12 from the actuator output 14, the user grips the head 78 of the knob 72 and pulls it away from the housing 22 against the force of the spring 100 so as to extend the shaft 64 from the housing. The frame 90, being connected to the shaft 64, moves downwardly (in the sense of the figures). This causes the pins 110 engaged in the cam grooves 140 to be pushed to the right (again in the sense of the figures) as shown in FIGS. 4 and 5. This causes the block 120 also to move in that direction and in so doing the first end 124 of the block 120 engages the flange 50 of the coupling sleeve 42 and so moves the coupling sleeve 42 in that direction against the biasing force of the spring 56. This disconnects the drive. The user then rotates the head 78 of the knob such that the lower edge 86 of the wall 80 of the knob 72 is received on the housing lip 84. This retains the knob 72 in the extended position. It will readily apparent to the user that the knob 72 has been extended as the coloured central section 76 of the knob shaft 64 will now be visible.

In this condition, should the motor 12 be started inadvertently then no movement will result at the actuator output 14, thereby avoiding possible injury to the user. Moreover, as there is no drive connection between the actuator output 14 and the motor 12, the linkage 6 may be moved without encountering any resistance from the motor 12 which might arise, for example from motor cogging or a no-power brake on the motor 12. This will make manipulation of the actuator output 14, linkage 6 and flap 8 easier.

When it is desired to reconnect the motor 12, the user simply has to rotate the head 78 of the knob 72 in the opposite direction to disengage the lower edge 86 of the wall 80 of the knob 70 from the housing lip 84. The knob 72 will then return to the position shown in FIG. 3 by virtue of the bias of the spring 100, with the pins 110 being pushed to the top (in the sense of the Figures) of the grooves 140 due to the upward movement of the frame 90. This moves the block 120 to the left (in the sense of the Figures) allowing the coupling sleeve 42 to move to the left under the biasing force of the spring 56, thereby reconnecting the drive. Should the splines 44 of the coupling sleeve 42 have become rotationally misaligned with the splines 46 of the input shaft 30 (for example due to movement of either the motor 14 or the actuator output 14 during the period of disconnection) the coupling sleeve 42 may not engage with the input shaft 30. However, as soon as the motor 12 begins to rotate or the actuator output 14 is manipulated, the splines will come into alignment once more and the coupling sleeve 42 then fully reengage with the input shaft 30 under the biasing force of the spring 56.

Figure 6:
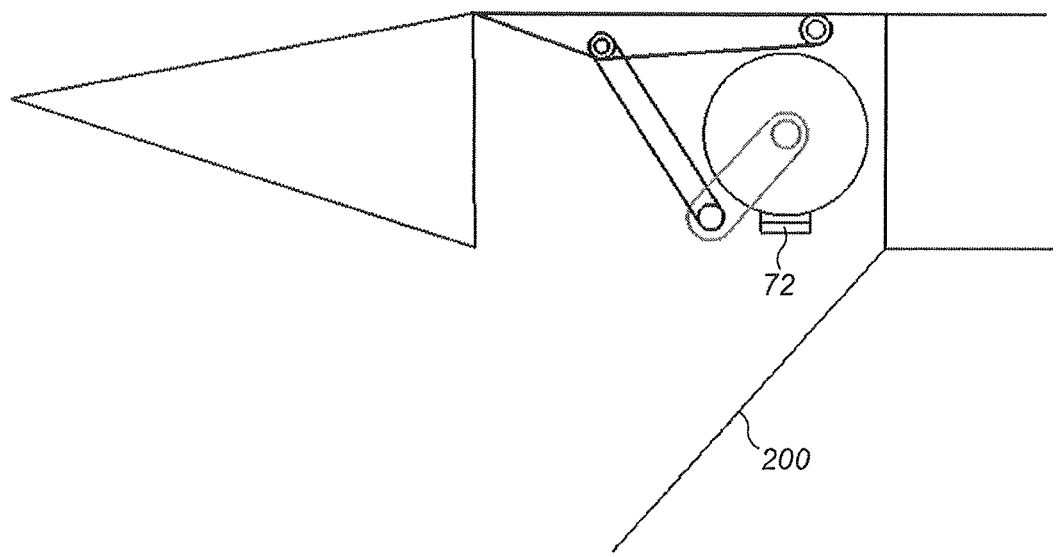
FIG. 6 shows the installation of FIG. 1 in a second condition.

As discussed above, the drive disconnection system in accordance with this disclosure may be used in a wide variety of applications. In the embodiment illustrated in FIG. 1, the disconnection system is arranged within a cavity 18 in an aircraft wing. The cavity is closed by a door 200 which must be opened, as shown schematically in FIG. 6, to access the actuator 4 and the disconnection system 20.

Figure 7:
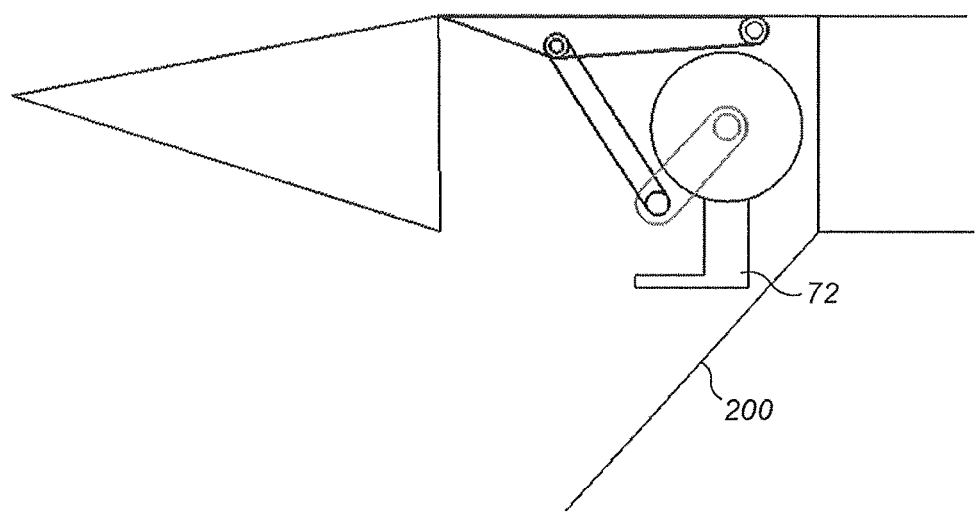
FIG. 7 shows the installation of FIG. 1 in a third condition.

When maintenance or other operations need to be performed on the actuator 4, the knob 72 of the disconnection system is extended from the system housing as discussed above and maintained in that extended position. This is shown schematically in FIG. 7. It will be seen from this Figure that in this position the knob 72 will prevent the door 200 being closed. This will serve to remind the user that the drive system is disconnected and that it must be reconnected before the door 200 can be properly closed.

Thus in the described embodiments a number of advantages may be provided by the disclosure. The motor disconnection avoids unintended actuator motion if the motor start accidentally during maintenance of the actuator. The motor disconnection also reduces back-driving torque due to motor cogging torque or a no power brake on the motor, making maintenance easier. Also, the position of the operating member in its retracted position can be used to indicate that the drive is disconnected by preventing the closure of the door access.

It will be understood that the above is a description of just one non-limiting embodiment of the disclosure and that modifications may be made thereto within the scope of the disclosure.

For example, while the system is shown as applied to an electric drive motor, it may also be applied to other forms of rotary drives, for example hydraulic or pneumatic drive systems.

Also, while the cam mechanism is shown as comprising pins 110 provided on the frame 90 and grooves 140 provided on the block 120, other mechanisms may be used. For example, if space permits, the pins 110 may be provided on the block 120 and the grooves 140 on the frame 90.

Also, in other embodiments, movement of the operating element 34 out of the housing 22 may be accomplished by rotating the operating element 34 about axis A if a suitable cam mechanism is provided between the operating element 34 and the housing 22.

The invention claimed is:

1. An actuator drive disconnection system comprising:
 a housing;
 a drive coupling mounted in the housing, the drive coupling coupling a drive motor to an actuator drive train; and
 a manually operable drive disconnection mechanism for selectively moving the drive coupling from a first position in which the motor and actuator drive train are coupled and a second position in which the motor and actuator drive train are disconnected;
 said mechanism comprising an operating element which is manually extendable out from the housing to an extended position so as to move the drive coupling from the first position to the second position.

2. The actuator drive disconnection system as claimed in claim 1, wherein the housing and operating element are provided with inter-engaging formations for retaining the operating element in the extended position of the operating element.

3. The actuator drive disconnection system as claimed in claim 2, wherein the operating element comprises a head portion which is rotatable so as to bring the retaining formations into engagement.

4. The actuator drive disconnection system as claimed in claim 1, wherein a section of the operating element extended from the housing is marked for indicating that the operating element is extended.

5. The actuator drive disconnection system as claimed in claim 1, wherein the drive coupling comprises a coupling element which is movable axially along a common axis of a motor output and the actuator drive train input to disconnect the motor from the actuator drive train.

6. The actuator drive disconnection system as claimed in claim 5, further comprising a disconnection element operatively coupled to the operating element and to the drive coupling element for moving the drive coupling element from the first position to the second position as the operating element is extended from the housing.

7. The actuator drive disconnection system as claimed in claim 6, wherein the disconnection element is mounted around the coupling element and engages the coupling element to effect the movement.

8. The actuator drive disconnection system as claimed in claim 7, wherein the coupling element comprise a flange, and the disconnection element engages the flange to effect the movement.

9. The actuator drive disconnection system as claimed in claim 6, comprising a linkage for converting movement of the operating element along an axis of the operating element into axial movement of the disconnection element.

10. The actuator drive disconnection system as claimed in claim 9, wherein the linkage is a cam mechanism.

11. The actuator drive disconnection system as claimed in claim 10 wherein a frame is connected to the operating element for receiving the disconnection element, with one or more cams formations being provided between the frame and the disconnection element.

12. The actuator drive disconnection system as claimed in claim 11, comprising an inclined groove on the disconnection element and a pin on the frame engaging with the groove whereby movement of the frame by the operating element causes the pin to move along the groove, thereby effecting the axial movement of the disconnection element and thus of the coupling element.

13. The actuator drive disconnection system as claimed in claim 6, wherein a clearance is provided between the disconnection element and the drive coupling element when the drive is engaged.

14. The aircraft wing comprising a cavity which is closed by a door, and an actuator disconnection system as claimed claim 1, wherein the disconnection mechanism of the actuator disconnection system is arranged within the cavity, and the door must be opened to gain access to the operating element of the disconnection mechanism and wherein in the extended position of the operating element, the operating element is arranged so as prevent the door being closed while the drive is disconnected.

15. A method of performing maintenance on an actuator system driven by an electric drive motor comprising:
 disconnecting the drive motor from the actuator, by means of an actuator drive disconnection system as claimed of claim 1.

* * * * *